United States Patent [19]

Johnson et al.

[11] 3,824,378

[45] July 16, 1974

[54] ELECTRONIC COUNTER

[75] Inventors: George W. Johnson, Woodbury; Maurice D. Teichner, New Canaan, both of Conn.

[73] Assignee: Presin Company, Inc., Shelton, Conn.

[22] Filed: Sept. 13, 1972

[21] Appl. No.: 288,518

[52] U.S. Cl. .......... 235/92 PE, 328/48, 235/92 CA, 235/92 CC, 235/92 R

[51] Int. Cl. .......... H03k 21/36

[58] Field of Search ....... 235/92 CA, 92 PE, 92 CC, 235/92 DP; 328/48; 340/146.2

[56] References Cited

UNITED STATES PATENTS

| | | | |
|---|---|---|---|
| 3,490,017 | 1/1970 | Kolell et al. | 235/92 CA |
| 3,534,398 | 10/1970 | Wasda | 235/92 PE |
| 3,581,066 | 5/1971 | Maure et al. | 235/92 CC |
| 3,604,903 | 9/1971 | Hill et al. | 235/92 PE |

*Primary Examiner*—Paul J. Henon
*Assistant Examiner*—Joseph M. Thesz, Jr.
*Attorney, Agent, or Firm*—Joseph Levinson, Esq.

[57] ABSTRACT

A battery-sustained multiple level electronic counter is provided which includes an N-bit memory and an address counter and control for the memory. A single bank of a plurality of binary code decimal input switches are provided which are set for preset levels to be stored in the memory utilizing a much smaller number of address-select binary code decimal switches coupled to the address counter. The number of digits of the address-select switches corresponds to the number of preset levels desired to be measured. An N-digit binary code decimal counter and multiplexer is fed by the count input and coupled to a comparator which is also coupled to the memory. Signals are fed to the comparator from the binary code counter and multiplexer and the N-bit memory under the control of the address counter and control to provide an output when a preset level is hit. A hit counter is also provided which is coupled to the output of the comparator for resetting the binary code counter and multiplexer. The system can be modified using remote actuation so that the preset values cannot be tampered with, once they are set, or a single preset level can be utilized, or the system can operate as a totalizer.

6 Claims, 1 Drawing Figure

PATENTED JUL 16 1974 3,824,378
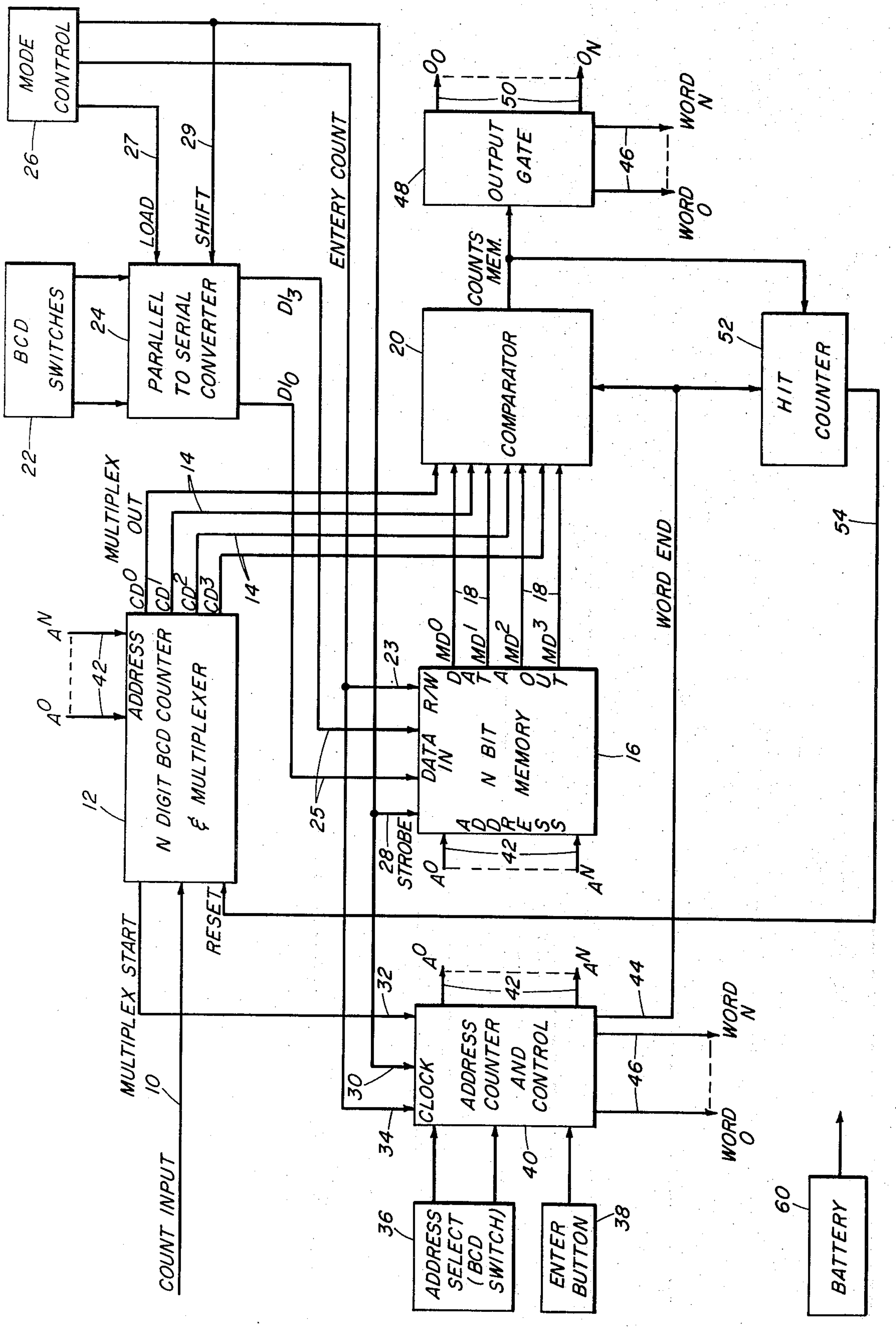

ELECTRONIC COUNTER

BACKGROUND OF THE INVENTION

A predetermining counter is defined as a device accumulating counting impulses on contact closures, photoelectric beam interruptions, or other transducer actions. Such counters are preset by means of thumbwheel switches, or, if electromechanical, by means of pushbuttons to preset, count, and either count up to the present count whereat a contact closure is given, or count down to zero where the same function is performed. Such contact closures are used for process control purposes, for example, to start motors, latch relays, shift gates, etc.

Preset counters are useful in batch measuring where, when a predetermined count is reached, the counter automatically gives the required output signal and immediately resets to a start position. As a typical example, batching would be useful in counting pills of a predetermined quantity into a bottle, taking away the filled bottle, and recounting until the next bottle is filled, or in determining by count proportions of a chemical mix.

Electronic, electromechanical, or mechanical counters of various types all perform these functions. Electromechanical counters are generally smaller in size than electronic counters, and in the case of a power failure the count accumulated and the preset levels are retained in the memory of the mechanical movement, whereas they are lost in the electronic counter. However, the mechanical and electromechanical counters suffer the disadvantage of having slow count rates, and very slow recycling rates, with the absolute maximum limited to 3000 counts per minute. Electro-mechanical counters also have a finite life, with a maximum number of counts and reset cycles, the latter being between one-half and one million for most makes. This is inadequate for many applications. Also, in typical batching applications, 200 milliseconds is required for resetting, which means that in practice, as a steady stream of input counts is entering the counter, the speed of the count is limited to 2 to 3 per second, or else the count will be lost during recycle. In subtracting predetermining counters, it is possible to have a precontact installed. However, in adding predetermining levels, additional banks of wheels must be installed for each level of predetermination. Thus, the number of predetermined points is mechanically limited to a rather low number, and non-digital drum programmers substituted when a multiplicity of set points is mandatory in mechanical counters.

Contrasted with the mechanical and electromechanical counters, all electronic counters have practically infinite life, very high speed, and in batching applications the recycling rate between batches is for all practical purposes extremely short, and no counts are lost. However, because of the speed of the electronic counter, line surges and noise spikes may be seen by the counter as true counts, despite extensive filtering and high level logic, as the logic section can never be totally isolated from the AC or DC power source. In case of power-line loss and unless separate auxiliary power is attached, the memory of the accumulated count is lost, and therefore the position during any one accumulative cycle. Also, for every level of predetermination there must be one bank of selector switches, making the counter very large and very expensive.

SUMMARY OF THE INVENTION

Accordingly, it is an object of this invention to provide an electronic counter which enjoys the advantages and overcomes the disadvantages referred to above with respect to other mechanical, electromechanical and electronic counters.

A further object of this invention is to provide an improved electronic counter which has both inherent memory and multiple preset points in which neither the count nor the preset levels are lost in case of power line losses or failures.

Another object of this invention is to provide an improved electronic counter which is reduced in size and cost.

In carrying out this invention in one illustrative embodiment thereof, one or more preset levels are achieved employing only one bank of digital switches which insert the desired count at each level into memories built into the counter. The preset level is selected by means of an extra digital switch means which commands an address counter and control and the location of the number in the memory. Outputs from a binary coded decimal (BCD) counter and multiplexer are applied to a comparator along with the outputs of the memory, the comparator producing an output when the count reaches the preselected value in the memory. The counter is also automatically reset pursuant to the outputs from the comparator. The entire counter logic is made utilizing complementary MOS circuitry which consumes little current and can be driven by a single battery and maintained in operating condition for a long period of ordinary operation.

BRIEF DESCRIPTION OF THE DRAWING

The drawing is a schematic block diagram of one form of the electronic counter embodied in this invetnion.

DESCRIPTION OF THE PREFERRED EMBODIMENTS

Referring now to the drawing, which is a block diagram of an illustrative embodiment of the present invention, count inputs caused by contact closures, photoelectric beam interruptions, or the like, are applied via line 10 to the input of an N-digit binary coded decimal (BCD) counter and multiplexer 12. Each digit consists of a conventional counter operating in the BCD mode. The counter and multiplexer 12 also generates a multiplex start signal on line 32 after each count, which in turn initiates one cycle of comparison, counter 12 to a memory 16 to be described hereinafter. Address decoder outputs applied from an address counter and control 40 to be described hereinafter are applied via lines 42 to control multiplexer digit selection from the counter and multiplexer 12. The BCD counter and multiplexer counter 12 provides outputs on lines 14 representing signal CD-0 to CD-3, which represents four bits for each digit in bit parallel-serial digit which are applied to a comparator 20 for each comparison. Accordingly, in a single bit time, a full digit is transferred, and in the following bit time, another digit is transferred, whereby the basic pulse period represents not only a bit time, but also a digit time. The counter and multiplexer 12 is also provided with a reset-to-zero capability which is represented at its input by a line 54.

A memory 16 is provided which is a four-bit by N memory which is used to store the BCD preset numbers. The memory 16 is provided with a strobe line 28, data-in lines 25, and a read-or-write line 23, which would correspond to the enter or count mode for the counter. Data-out from the memory 16 is provided via lines 18 respresenting MD-0 to MD-3, which provides four bits for each digit in bit parallel-serial digit for comparison to the comparator 20. The N-bit memory 16 is controlled by address decoder outputs $A_0$ through $A_N$ via lines 42 to select the proper preset numbers and apply them via lines 18 to the comparator 20 for comparison with the count-output signals. The drawing illustrates a random access memory although shift registers may be utilized. Memory size is determined by the maximum preset value and the number of different presets desired. Access time for the memory 16 is determined by the input-count frequency, as comparison to all preset values must be made between input pulses.

The preset levels in the memory are provided by a single bank of binary coded decimal (BCD) switches 22. The BCD input switches 22 are thumb-wheel switches which provide an output in the form of a BCD code for the decimal digit set in each switch. The number of switches is determined by the largest value preset number desired. For example, 999,999 requires six digits, and accordingly six switches. The BCD input switches 22 are coupled to a parallel-to-serial converter 24 which in turn is coupled to the input memory via lines 25. The parallel-to-serial conversion is made in the converter 24 to convert N-digit parallel preset numbers into bit parallel-serial digits $DI_0$–$DI_3$. The parallel bits are entered into a register and shifted serially into memory, completing the conversion. Although the coupling between the converter 24 and the N-bit memory 16 is represented by lines 25, it will be understood that four such lines would be required for four bits in the parallel-to-serial conversion described.

A mode control 26 is coupled to the converter 24 via lines 27 and 29, to the N-bit memory via lines 23 and 28, and to the address counter and control 40 via lines 30 and 34 to control the enter or count modes. The mode-control 26 includes a lock switch which is used to select either the enter or count modes, and the switch controls a clock-pulse generator which provides the necessary actuation for the converter 24, memory 16, and address counter and control 40. When the mode control 26 is in the enter position, preset numbers are entered into the memory 16. When the mode control 26 is in the count mode, the counter and comparison circuits are enabled to perform the counting and comparison functions.

The address counter and control 40 consists of a binary counter which controls multiplexer output and selects memory address for entering or reading preset numbers. In entry mode, the starting address for a preset number location in the memory 16 is set into the counter 40 via BCD address switches 36. The number of BCD address switches 36 utilized depends on the number of preset levels to be set in the memory. For example, 10 preset numbers would require two BCD address switches, while 1000 would require four. An entry button 38 is provided which is activated once the address switches are set. The address counter 40 is then incremented as each digit of the preset number is entered into memory. A bit output $A_0$ to $A_N$ is provided on lines 42, while a word output is provided on lines 46, and an end-of-word output provided on line 44. When in the count mode, the address counter and control 40 starts at zero and is incremented with each preset number digit appearing on lines 42, causing the memory 16 output to correspond with multiplex BCD counter 12 output at the comparator 20 on a digit-by-digit basis. The comparator 20 which is fed from the multiplex output of the counter and multiplexer 12 and the N-bit memory 16 under control of the address counter and control 40 provides a sequential comparison between BCD counter and multiplexer 12 outputs and preset values stored in the memory 16. At the beginning of each preset number word, a test binary is reset to zero state, each digit is compared, and if not equal, the binary is set; if comparison is equal, the binary remains reset. At the end of each word (number), the binary is tested to determine when an equality exists, and when it does an output is presented which is applied to an output gate 48. The output gate 48 is an AND gate with an input from the comparator and a word input via lines 46 from the address counter and control 40. On coincidence, an output 50 is presented, $O_0$ through $O_N$, as each preset value is reached. Output requirements vary greatly, and are adjustable from 25 milliseconds to 1 second.

A hit counter 52 is coupled between the output of the comparator 20 and the input of the counter 12 via line 54 for resetting the BCD counter and multiplexer 12. A word end is also coupled from the address counter and control 40 to the hit counter 42. When the count equals a preset number at word end, the hit counter 52 is advanced. Hits-complete is transmitted when all preset values have been located, causing the counter 12 to reset, hit counter 52 to reset, and a new count cycle to begin.

The entire electronic counter is powered by a standard 9-volt transistor battery, and employs complementary metal oxide semiconductor logic devices. With the basic counting logic built with COS-MOS circuitry, current is consumed in the hundred microampere range, and the components operate at logic levels from 5 to 15 volts by using a battery with approximately 600–700 mA hours. Normal transistor-to-transistor logic integrated circuitry has much greater power requirements and operates at lower logic levels, thus making them much more susceptible to noise. The present counter can be maintained in operating condition for approximately a year of ordinary operation by use of a single cheap battery.

Recapitulating, a multilevel preset counter in accordance with the present invention is a device used to accumulate pulses or contact closures, photoelectric beam interruptions, or other transducer actions with an output being provided at each preset level and used to control various process control equipment, such as to start motors, latch relays, etc. Preset levels are entered into the counter by means of a single set of BCD switches 22, memory address selection switches 36, and an enter button 38. The number of preset levels contained within the counter has no limit except by the number of levels required for use in control applications. In a typical operation, using a predetermined number of preset numbers, the mode control 26 is set to select the enter mode. The select memory address switch 36 is set to 1, and the first preset number is set in the BCD switches 22, whereupon the enter button 38 is depressed. The first preset number has now been entered into the memory 16. The address select switch 36 is then changed to 2, and the process is repeated unitl all of the preset numbers have been entered. The mode control 26 is then set to the count mode, and counting impulses are applied to the counter 12. After each input pulse, contents of the counter 12 are compared to each stored number in the memory 16 by the comparator 20 under control of the address counter 40. When the counter value and the number in the memory are equal, a hit is recorded, and an output control signal is activated by the output gate 48, which output may be a relay closure, electronic drive signal, etc. Counting and comparison continues until a hit is recorded for each preset number. After all preset numbers have been reached, the counter 12 is reset by the hit counter 52 and a new cycle is started. Resetting is accomplished without delay so that no input count signals are lost.

The multiple preset counter may be constructed from standard logic building blocks which are available from a number of sources. As an illustrative embodiment, COS–MOS logic circuitry for the various components of the counter may be, as one example, as follows:

BCD counter and multiplexer — (RCA) CD4029AE, CD4016AE, CD4011AE, CD4022AE

Memory — (Motorola) MCM14505, (Solid State) SCL5555D

BCD input switches — (Dialight) 545-0105-801 or (Digitran) 29000 series

Parallel-to-serial converter — (RCA) CD4021AE

Mode control — (RCA) CD4027AE, CD4001AE, CD4023AE

Address counter and control (RCA) CD4029AE, CD4027AE, CD4011AE, CD4001AE

Comparator — (RCA) CD4030AE, CD4013AE

Hit Counter — (RCA) CD4017AE

Output gating — (RCA) CD4001AE, CD4011AE

The multiple level preset counter described above can be modified to provide additional security where it may be necessary to prevent anyone from being able to change preset values in the counter. Instead of having mode, enter, and BCD preset switches located on the multiple preset counters, a remote keyboard can be used to enter preset numbers. The keyboard is portable with a cable attached so that it may be plugged into any multilevel preset counter. The operation of the counter remains the same except for the entry mode. With a portable keyboard it will be necessary to enter each number as is done on the calculator or adding machine, with the most significant digit first; then after completion of the last digit, the entry button is depressed.

As an alternate to the multiple level preset described, a single-level preset counter can be provided in which the memory, address counter, and hit counter are eliminated. In this embodiment the BCD switches are the memory, and comparison after each count is made between the counter and the BCD switches. When the preset value on the BCD switches is reached, an output is activated, the counter is reset, and a new cycle is started. In the single level preset counter, an alternative mode may also be incorporated, in which the counter may continue to count until an external reset signal is applied. Power for this counter is the same as above, utilizing a battery which provides complete isolation from power failure, transients, or noise. The counter may also utilize the counting element without any preset functions. By adding a decoder driver and display, for example a liquid crystal display, to the BCD multiplexer output, the counter display becomes a totalizer which is battery powered with inherent memory capability, and is completely isolated from power failures, transients, or noise.

The counters described herein have equal applicability to timers and digital meters used to record events per unit of time. The only modification required to the counters described would be the addition of a time basis, and auxiliary controls to convert the counter to a time-base counting function. As has been pointed out above, since the electronic counters described are all powered by battery, the counting circuits are completely isolated from line noise and there is no danger of power failure causing loss of memory. This is especially important in predetermining of batching operations in a noisy industrial environment where loss of count or memory might cause the count control over expensive converting operations to be lost. The counters of the present invention have inherent memory so that no count can be lost by noise, power drops or outages. In the multiple level predetermining counter, output signals are provided at several predetermining points during an entire count cycle. This is accomplished in the present invention employing only one bank of digital switches to achieve a multiplicity of set points. Since the device is sustained by battery power, both inherent memory and multiple preset points are achieved and neither the count nor the preset level points can be lost in the case of a power outage. By using a single digital switch, the size and cost of the unit are also reduced.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

We claim:

1. A multilevel preset electronic counter for providing an output at each preset level, comprising a. a memory, b. a single bank of binary coded decimal input switches coupled to said memory, the number of which corresponds to the largest value preset number desired, for providing an output code for the decimal digit set in each switch and the number set in a plurality of said input switches, c. address counter and control means coupled to said memory for controllably storing a plurality of preset levels set by said input switches in said memory and controlling the output of said memory, d. address select switching means comprising a second binary code decimal switch means in which the number of switches corresponds to one for each decimal of preset levels which are to be stored in said memory, said address select switching means coupled to said address counter and control means for controlling the entry of preset numbers from said bank of binary coded decimal input switches, e. comparator means coupled to said memory, f. a binary coded counter and multiplexer coupled to said comparator means and said address counter and control means and having a count input applied thereto for generating a multiplex start signal which initiates a counter to memory comparison on the input of each count applied thereto, and g. output gating means coupled to said comparator means for producing an output signal when a preset number stored in said memory is reached by said counter.

2. The counter set forth in claim 1 having an enter button coupled to said address counter and control means which is depressed each time a preset number is stored in said memory from said binary code decimal input switches and said address select switching means.

3. The counter set forth in claim 1 having a word end output corresponding to the end of each preset number from said address counter and control means coupled to said comparator for providing an output from said comparator for every preset level.

4. The counter set forth in claim 3 having a word output from said address counter and control means coupled to said output gating means for passing an output from said comparator means through said output gating means on the coincidence of each preset number.

5. The counter set forth in claim 4 having a hit counter coupled to the output of said comparator and the input binary coded counter and multiplexer for resetting said binary coded counter and multiplexer after all of the plurality of preset levels are reached.

6. The counter set forth in claim 5 which is powered from a single battery source.

* * * * *